United States Patent
Chien

(10) Patent No.: US 6,765,324 B1
(45) Date of Patent: Jul. 20, 2004

(54) ELECTRIC GENERATOR FOR USE WITH A VEHICLE WHEEL

(76) Inventor: Long-Chen Chien, No. 286, Chia-Ha-Erh 2nd St., San-Min Dist., Kaohsiung City (TW)

(*) Notice: Subject to any disclaimer, the term of this patent is extended or adjusted under 35 U.S.C. 154(b) by 0 days.

(21) Appl. No.: 10/624,176

(22) Filed: Jul. 22, 2003

(51) Int. Cl.$^7$ ................................................ H02K 7/02
(52) U.S. Cl. ......................... 310/75 C; 290/55; 290/44; 180/2.2
(58) Field of Search ............................ 310/75 C, 75 R; 290/44, 55; 180/2.2

(56) References Cited

U.S. PATENT DOCUMENTS

| | | | | |
|---|---|---|---|---|
| 3,876,925 A | * | 4/1975 | Stoeckert | 322/1 |
| 4,179,007 A | * | 12/1979 | Howe | 180/2.2 |
| 4,423,368 A | * | 12/1983 | Bussiere | 322/35 |
| 5,038,049 A | * | 8/1991 | Kato | 290/55 |
| 6,700,215 B2 | * | 3/2004 | Wu | 290/44 |

* cited by examiner

Primary Examiner—Dang Le
(74) Attorney, Agent, or Firm—Christie, Parker & Hale, LLP

(57) ABSTRACT

In an electric generator, a housing mounted on a vehicle wheel has a surrounding wall extending from a periphery of a base wall and cooperating with the base wall to confine a receiving space. An air impeller is disposed in the receiving space, has a spindle coupled rotatably to the base wall, and is formed with multiple radial impeller blades such that flow of air into the receiving space through an inlet vent hole and out of the receiving space through an outlet vent hole when the vehicle wheel rotates results in rotation of the air impeller in the receiving space. A magnet ring is disposed in the receiving space around a stator coil, which is mounted securely in the receiving space, and is coupled co-rotatably to the air impeller such that rotation of the magnet ring results in an induced electrical current in the stator coil.

9 Claims, 9 Drawing Sheets ional electric generator 2:

ELECTRIC GENERATOR FOR USE WITH A VEHICLE WHEEL

BACKGROUND OF THE INVENTION

1. Field of the Invention

The invention relates to an electric generator, more particularly to an electric generator for use with a vehicle wheel.

2. Description of the Related Art

FIG. 1 illustrates a conventional electric generator 2 for use with a bicycle 1. The conventional electric generator 2 is mounted on a wheel axle 12 and provides electric power to a lamp 13 mounted on the bicycle 1.

Referring to FIG. 2, the conventional electric generator 2 is shown to include a housing 21, three stator coils 22, and three magnet rings 23. The housing 21 is secured to a wheel hub 14 on the wheel axle 12 such that the housing 21 is capable of rotating about the wheel axle 12 when a bicycle wheel 11 (see FIG. 1) rotates. The stator coils 22, which are connected in series, are disposed in the housing 21 and are mounted on the wheel axle 12. The magnet rings 23 are disposed in the housing 21 around the stator coils 22, and are mounted on an inner surface of the housing 21.

As such, rotation of the magnet rings 23 with the housing 21 when the bicycle wheel 11 rotates results in an induced electrical current in the stator coils 22 that is provided to the lamp 12 via a cable 24.

The following are some of the drawbacks of the conventional electric generator 2:

1. The bicycle wheel 11 must be detached when it is desired to install the electric generator 2.
2. Variations in speed of rotation of the bicycle wheel 11 results in an unstable induced electrical current such that the service life of the lamp 13 is adversely affected.

SUMMARY OF THE INVENTION

Therefore, the object of the present invention is to provide an electric generator for use with a vehicle wheel that can eliminate the aforesaid drawbacks of the prior art.

According to the present invention, there is provided an electric generator adapted for use with a vehicle wheel. The electric generator comprises:

a housing adapted to be mounted on the vehicle wheel and having a base wall and a surrounding wall that extends from a periphery of the base wall and that cooperates with the base wall to confine a receiving space, the surrounding wall being formed with inlet and outlet vent holes that are in spatial communication with the receiving space;

an air impeller disposed in the receiving space and having a spindle that extends in an,axial direction transverse to the base wall and that is coupled rotatably to the base wall, the air impeller being formed with a plurality of radial impeller blades such that flow of air into the receiving space through the inlet vent hole and out of the receiving space through the outlet vent hole when the vehicle wheel rotates results in rotation of the air impeller in the receiving space;

a stator coil mounted securely in the receiving space; and a magnet ring disposed in the receiving space around the stator coil and coupled co-rotatably to the air impeller such that rotation of the magnet ring with the air impeller results in an induced electrical current in the stator coil.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
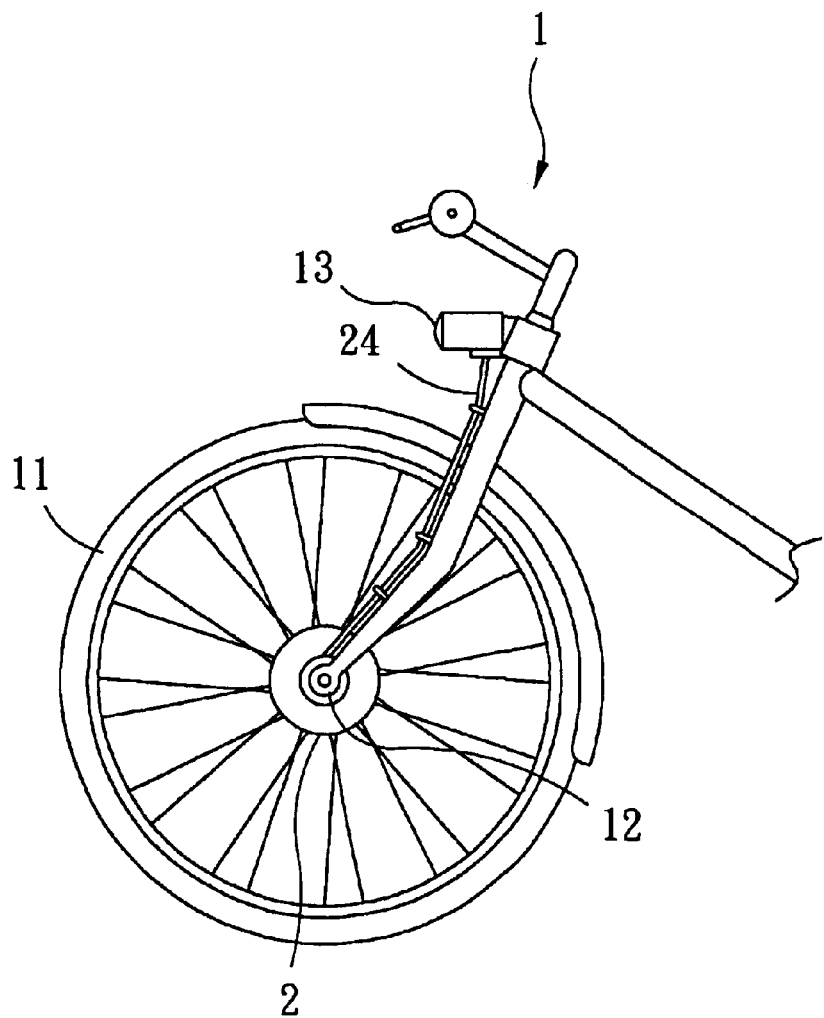
FIG. 1 is a fragmentary schematic view showing a conventional electric generator for use with a bicycle.
Figure 2:
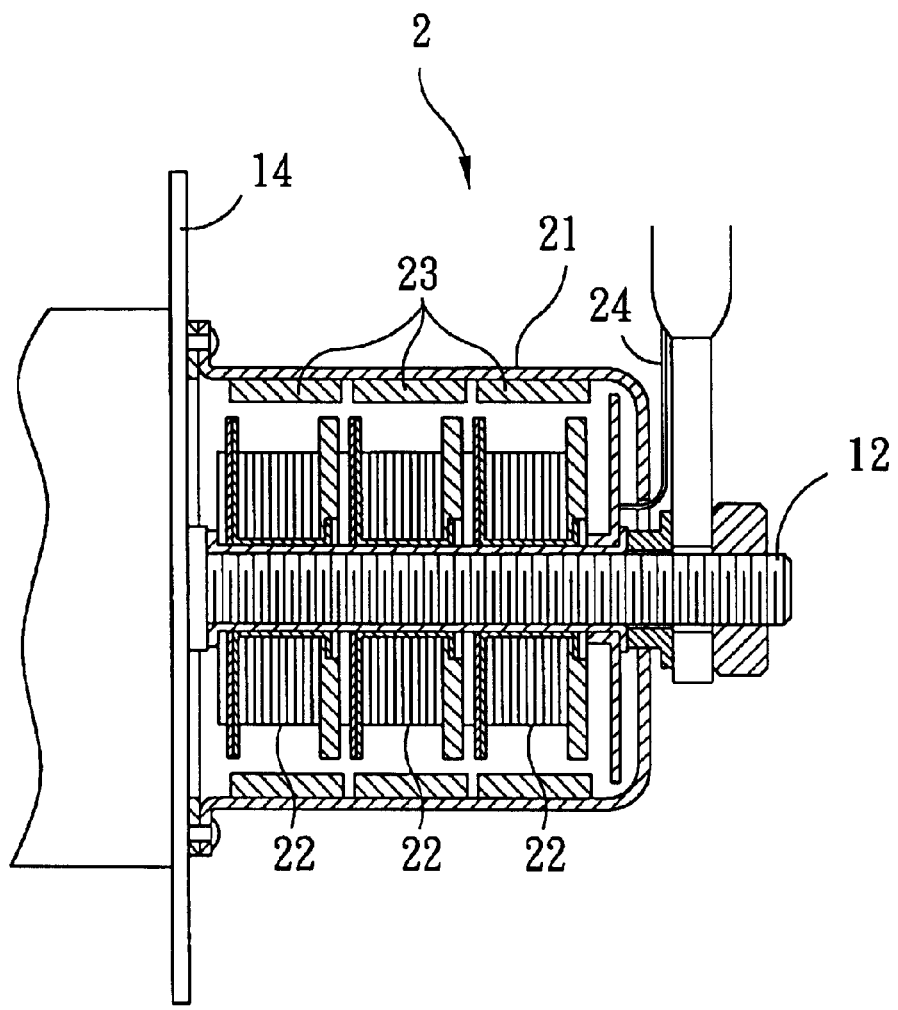
FIG. 2 is a schematic sectional view of the conventional electric generator.

Before the present invention is described in greater detail, it should be noted that like elements are denoted by the same reference numerals throughout the disclosure.

Referring to FIGS. 3 to 6, the first preferred embodiment of an electric generator 5 for use with a vehicle wheel 4 according to the present invention is shown to include a housing 51, an air impeller 521, a stator coil 522, and a magnet ring 523. In this embodiment, the vehicle wheel 4 includes a metal wheel body 41 formed with a plurality of fastener holes 42.

Figure 3:
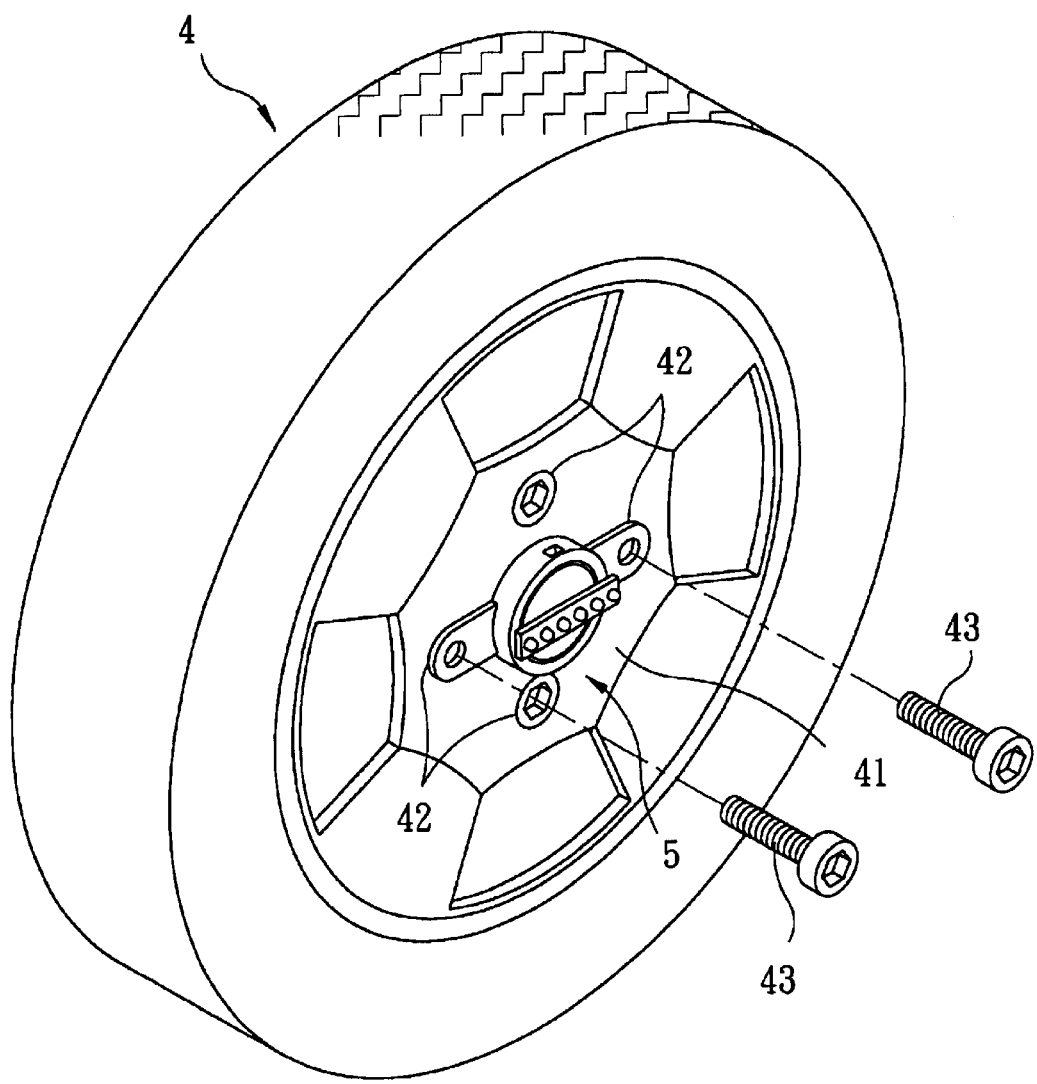
FIG. 3 is a perspective view showing the first preferred embodiment of an electric generator for use with a vehicle wheel according to this present invention.
Figure 4:
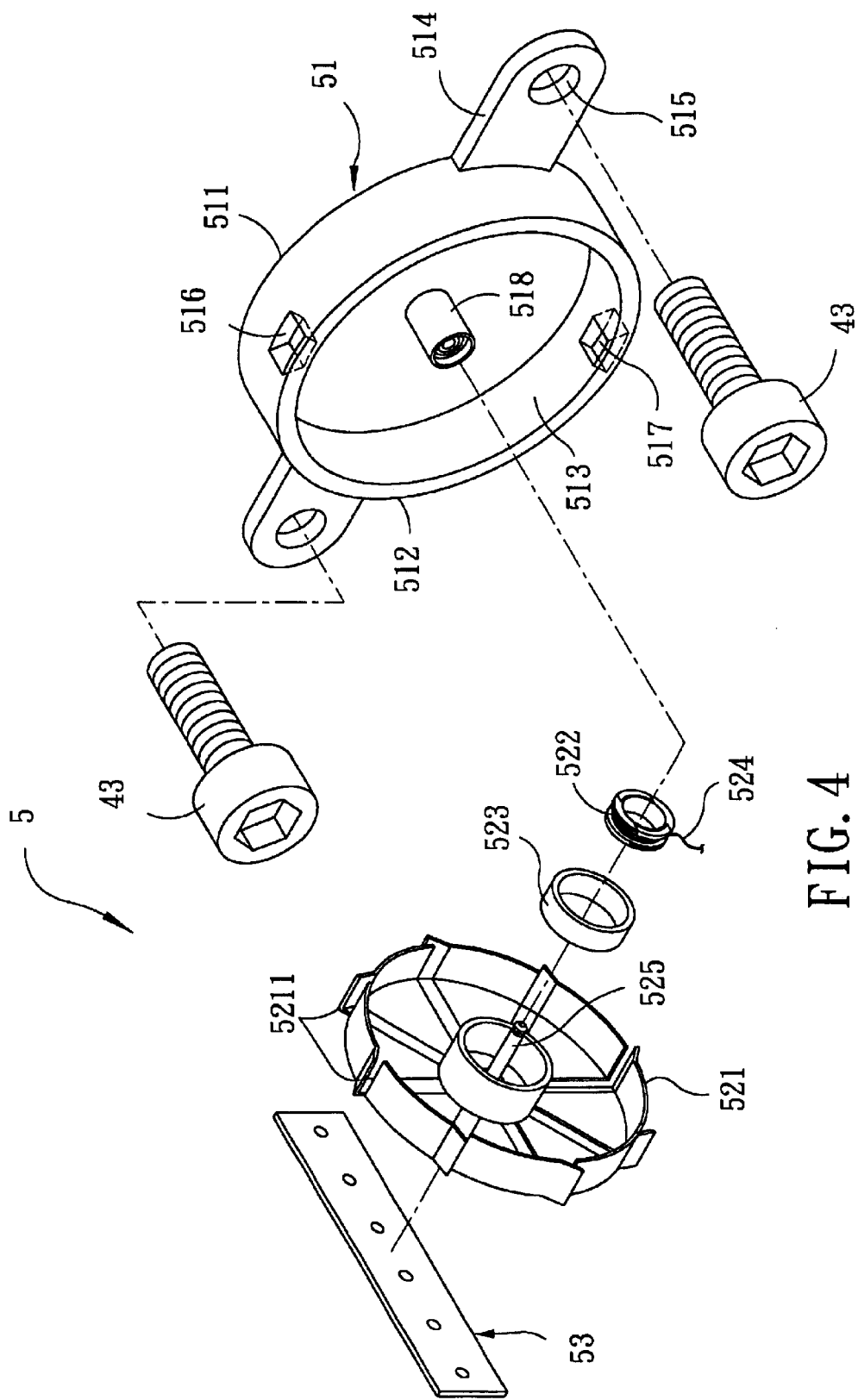
FIG. 4 is an exploded perspective view showing the first preferred embodiment.

The housing 51 is adapted to be mounted on the metal wheel body 41 and to be disposed at a center of the metal wheel body 41, as shown in FIG. 3. The housing 51 has a base wall 511, and a surrounding wall 512 that extends from a periphery of the base wall 511 and that cooperates with the base wall 511 to confine a receiving space 513. The base wall 511 is formed with a spindle sleeve 518 that extends into the receiving space 513. The surrounding wall 512 is formed with inlet and outlet vent holes 516, 517 that are in spatial communication with the receiving space 513. In this embodiment, the housing 51 is formed with opposite mounting lugs 514 that extend radially and outwardly from said surrounding wall 512. Each mounting lug 514 is formed with a lug hole 515 that is aligned with a corresponding one of the fastener holes 42 in the metal wheel body 41 and that permits extension of a corresponding fastener 43 through the lug hole 515 and into the corresponding one of the fastener holes 42 so as to permit fastening of the housing 51 on the vehicle wheel 4. Preferably, the inlet vent hole 516 tapers in a direction toward the receiving space 513.

The air impeller 521 is disposed in the receiving space 513, and has a spindle 525 that extends in an axial direction (A) transverse to the base wall 511 (see FIG. 5) and that is coupled rotatably to the base wall 511. In this embodiment, the spindle 525 is mounted rotatably in the spindle sleeve

518. The air impeller 521 is formed with a plurality of radial impeller blades 5211 such that flow of air into the receiving space 513 through the inlet vent hole 516 and out of the receiving space 513 through the outlet vent hole 517 when the vehicle wheel 4 rotate results in rotation of the air impeller 521 in the receiving space 513.

The stator coil 522 is mounted securely in the receiving space 513. In this embodiment, the stator coil 522 is secured on the spindle sleeve 518, as shown in FIG. 5.

Figure 5:
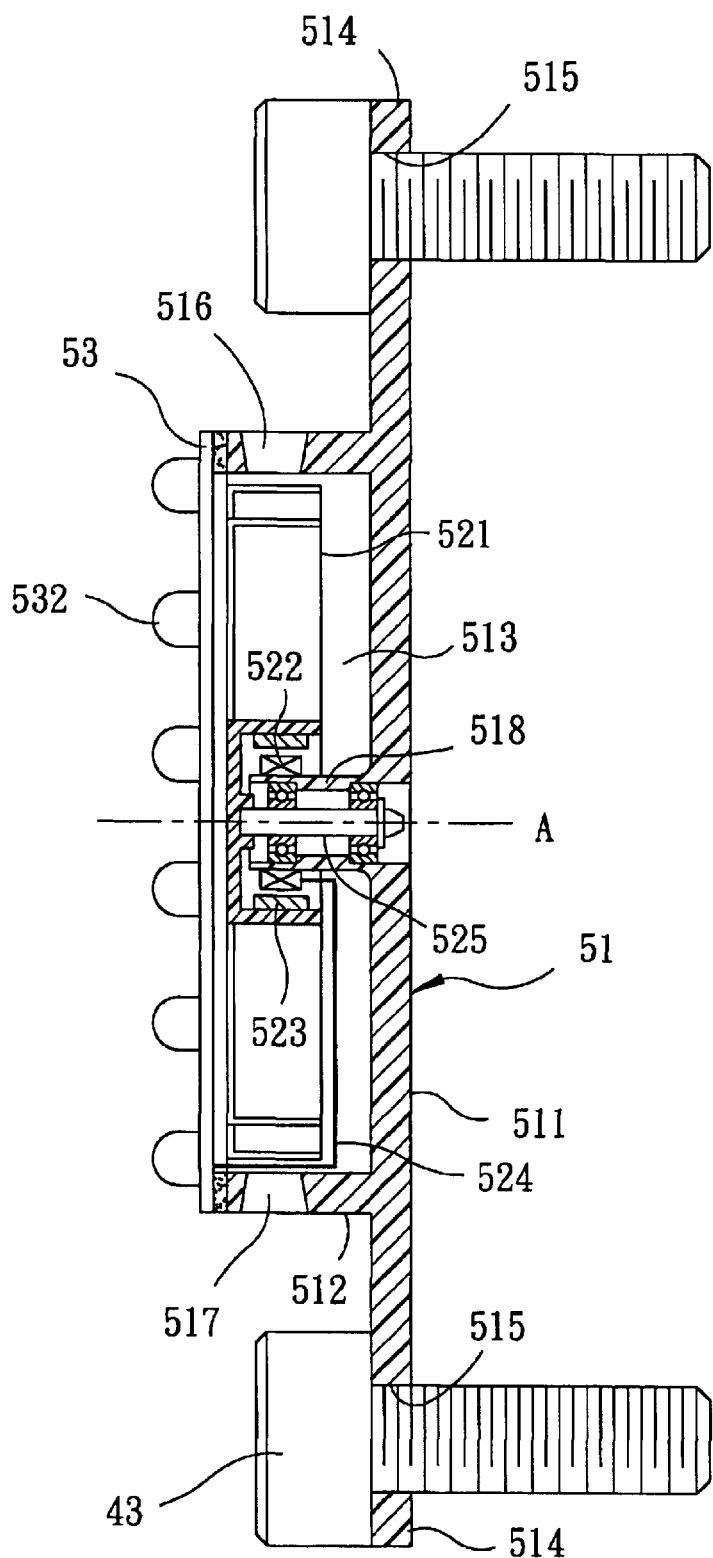
FIG. 5 is a schematic sectional view showing the first preferred embodiment.

The magnet ring 523 is disposed in the receiving space 513 around the stator coil 522, and is coupled co-rotatably to the air impeller 521, as shown in FIG. 5, such that rotation of the magnet ring 523 with the air impeller 521 results in an induced electrical current in the stator coil 522.

Figure 6:
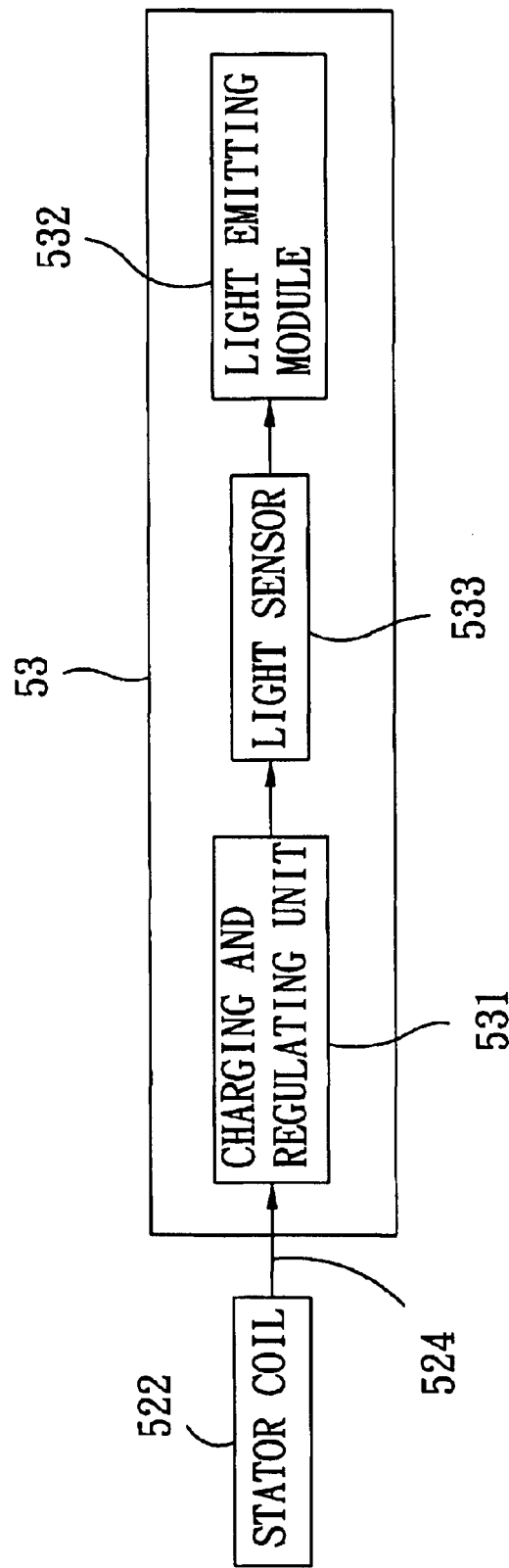
FIG. 6 is a schematic circuit block diagram illustrating the first preferred embodiment.

In this embodiment, the electric generator 5 further includes a circuit board 53, a charging and regulating unit 531, a light emitting module 532, and a light sensor 533, as shown in FIG. 6. The circuit board 53 is mounted on the surrounding wall 512 of the housing 51. The charging and regulating unit 531 is mounted on the circuit board 53 and is coupled electrically to the stator coil 522 through a conductor 524. The light emitting module 532 is mounted on the circuit board 53, and is coupled to and is driven by the charging and regulating unit 531. The light sensor 533 is coupled electrically to the charging and regulating unit 531 and the light emitting module 532 for selectively enabling and disabling operation of the light emitting module 532 in accordance with ambient light conditions. For example, the light sensor 533 disables operation of the light emitting module 532 during day time, and enables operation of the light emitting module 532 during night time. Since the charging and regulating unit 531 and the light sensor 533 are known in the art, a detailed description of the same is omitted herein for the sake of brevity.

When the light emitting module 532 rotates with the vehicle wheel 4, a large lighted area is formed as a result of vision persistence so as to achieve a desired warning effect.

It is noted that the induced electrical current generated by the electric generator 5 of the invention can also be applied to an electronic device in a vehicle.

Figure 7:
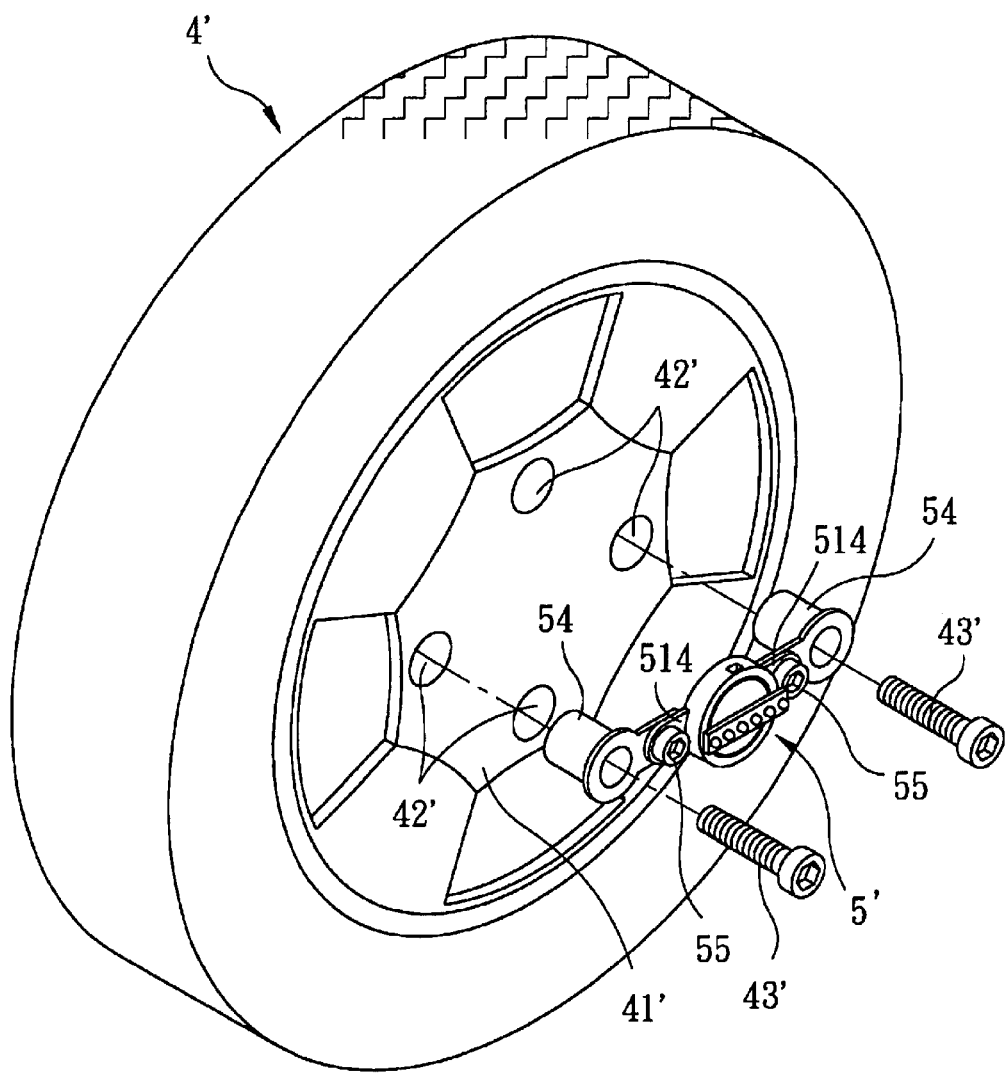
FIG. 7 is an exploded perspective view showing the second preferred embodiment of an electric generator for use with a vehicle wheel according to the present invention.
Figure 8:
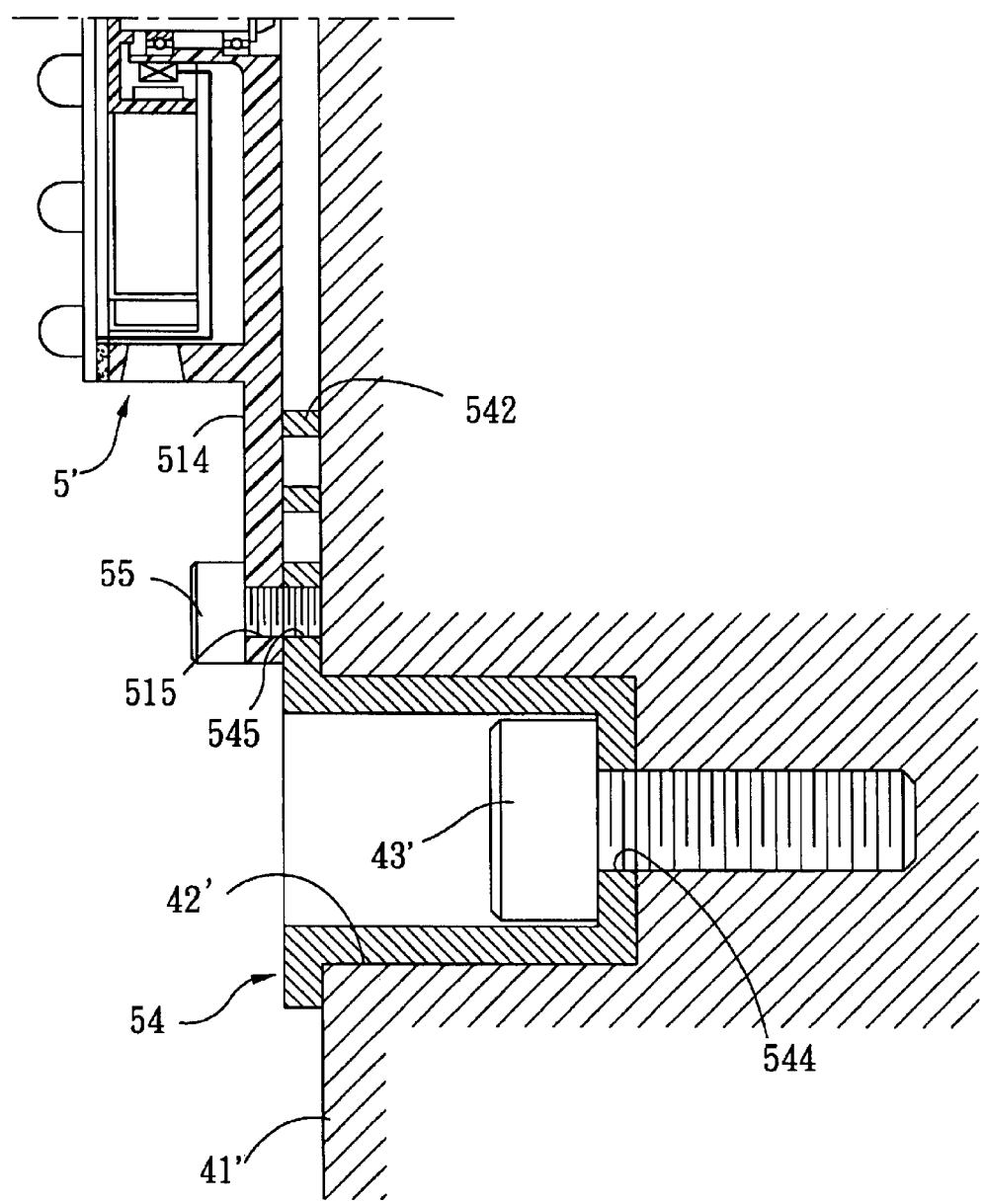
FIG. 8 is a fragmentary schematic sectional view showing the second preferred embodiment.

FIGS. 7 and 8 illustrate the second preferred embodiment of an electric generator 5' for use with a vehicle wheel 4 according to this invention, which is a modification of the first preferred embodiment. Like the previous embodiment, the metal wheel body 41' of the vehicle wheel 4' is formed with a plurality of fastener holes 42'. The electric generator 5' further includes a pair of anchor members 54, each of which is adapted to be disposed in and fastened to the vehicle wheel 4' at a respective one of the fastener holes 42' by means of a corresponding fastener 43' extending through a through hole 544 that is formed in the anchor member 54. Each of the anchor members 54 has a rim flange 542 adapted to be seated against the metal wheel body 41' of the vehicle wheel 4' outwardly of the respective one of the fastener holes 42'. Each of the mounting lugs 514 is disposed to lie against and is fastened by the corresponding fastener 55 to the rim flange 542 of a respective one of the anchor members 54. It is noted that each of the rim flanges 542 is formed with a plurality of positioning holes 545. The corresponding fastener 55 extends through the lug hole 515 in the mounting lug 514, and engages one of the positioning holes 545 in the anchor member 54 according to the size of the metal wheel body 41'.

Figure 9:
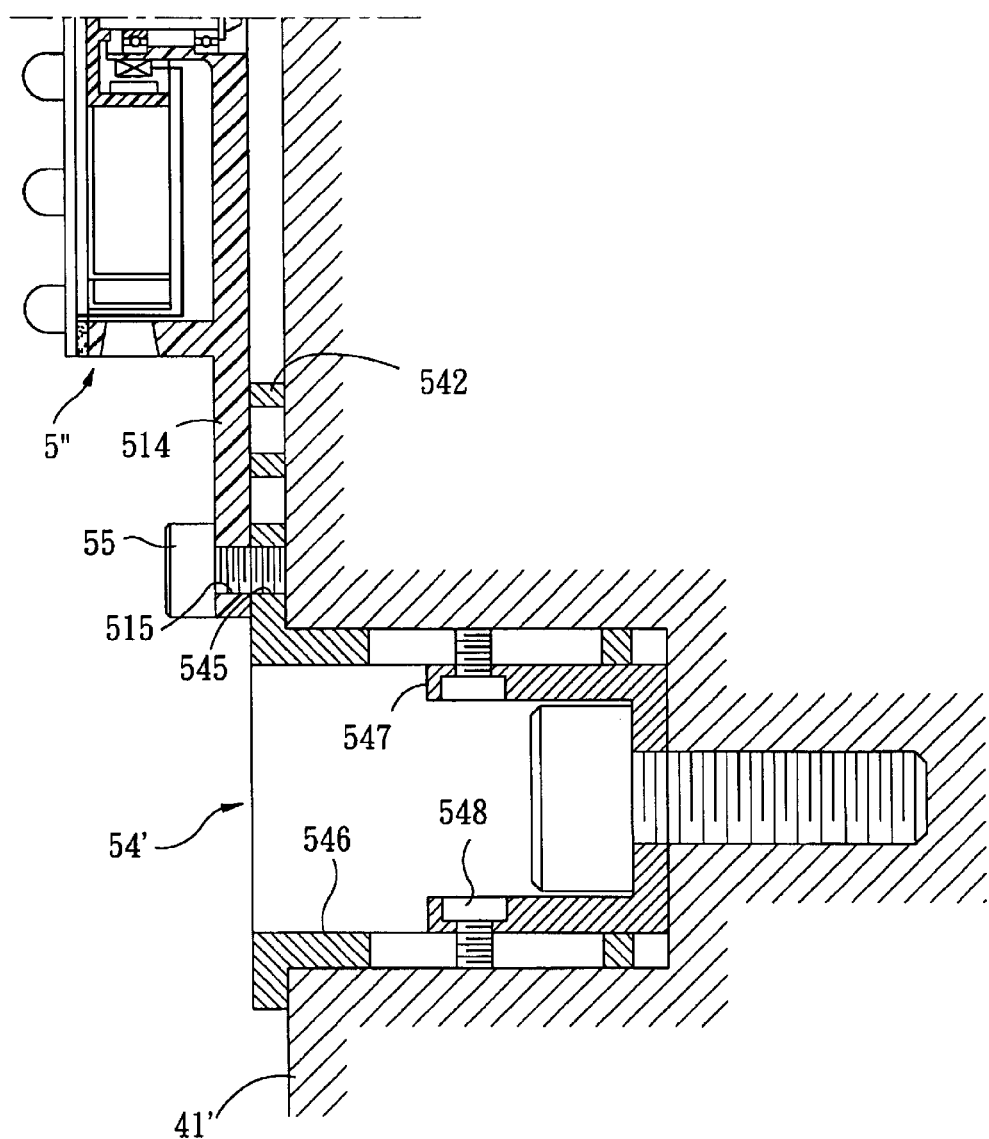
FIG. 9 is a fragmentary schematic sectional view showing the third preferred embodiment of an electric generator for use with a vehicle wheel according to the present invention.

FIG. 9 illustrates the third preferred embodiment of an electric generator 5" for use with a vehicle wheel according to this invention, which is a modification of the previous embodiments. Unlike the previous embodiments, each anchor member 54' includes an outer positioning tube 546 formed with the ring flange 542, and an inner anchoring seat 547 disposed in the positioning tube 546 and adapted to be fastened to the metal wheel body 41' of the vehicle wheel. In this embodiment, the inner anchoring seat 547 has a sleeve portion positioned in the outer positioning tube 546 by means of a plurality of positioning fasteners 548, each of which extends through a through hole in the sleeve portion and into a corresponding slot formed in the outer positioning tube 546 such that the inner anchoring seat 547 is movable relative to the outer positioning tube 546 so as to suit vehicle wheels of varying thickness.

The following are some of the advantages attributed to the electric generator 5, 5', 5" of the present invention:

1. Due to the presence of the charging and regulating unit 531, a stable working voltage can be provided to the light emitting module 532 so as not to adversely affect the service life of the light emitting module 532.
2. Due to the presence of the light sensor 533, the induced electrical current accumulated when the light sensor 533 disables operation of the light emitting module 532 can be applied to the light emitting module 532 even when the vehicle wheel is idle.
3. Due to the presence of the anchor members 54, 54', the electric generator 5, 5', 5" of the present invention can be applied to different vehicle wheels.
4. The electric generator 5, 5', 5" of the present invention can be directly installed on the metal wheel body 41, 41' without the need to disassemble the vehicle wheel.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electric generator adapted for use with a vehicle wheel, comprising:
    a housing adapted to be mounted on the vehicle wheel and having a base wall and a surrounding wall that extends from a periphery of said base wall and that cooperates with said base wall to confine a receiving space, said surrounding wall being formed with inlet and outlet vent holes that are in spatial communication with said receiving space;
    an air impeller disposed in said receiving space and having a spindle that extends in an axial direction transverse to said base wall and that is coupled rotatably to said base wall, said air impeller being formed with a plurality of radial impeller blades such that flow of air into said receiving space through said inlet vent hole and out of said receiving space through said outlet vent hole when the vehicle wheel rotates results in rotation of said air impeller in said receiving space;
    a stator coil mounted securely in said receiving space; and
    a magnet ring disposed in said receiving space around said stator coil and coupled co-rotatably to said air impeller such that rotation of said magnet ring with said air impeller results in an induced electrical current in said stator coil.

2. The electric generator as claimed in claim 1, wherein said base wall is formed with a spindle sleeve that extends into said receiving space, said spindle being mounted rotatably in said spindle sleeve, said stator coil being secured on said spindle sleeve.

3. The electric generator as claimed in claim 1, further comprising a circuit board mounted on said housing, and a charging and regulating unit mounted on said circuit board and coupled electrically to said stator coil.

4. The electric generator as claimed in claim 3, further comprising a light emitting module mounted on said circuit board and coupled to and driven by said charging and regulating unit.

5. The electric generator as claimed in claim 4, further comprising a light sensor coupled to said charging and regulating unit and said light emitting module for selectively enabling and disabling operation of said light emitting module in accordance with ambient light conditions.

6. The electric generator as claimed in claim 1, wherein said housing is formed with a plurality of mounting lugs, each of which is formed with a lug hole that permits extension of a corresponding fastener therethrough so as to permit fastening of said housing on the vehicle wheel.

7. The electric generator as claimed in claim 6, the vehicle wheel being formed with a plurality of fastener holes, said electric generator further comprising a plurality of anchor members, each of which is adapted to be disposed in and fastened to the vehicle wheel at a respective one of the fastener holes, each of said anchor members having a rim flange adapted to be seated against the vehicle wheel outwardly of the respective one of the fastener holes, each of said mounting lugs being disposed to lie against and being fastened by the corresponding fastener to said rim flange of a respective one of said anchor members.

8. The electric generator as claimed in claim 7, wherein each of said anchor members includes an outer positioning tube formed with said rim flange, and an inner anchoring seat disposed in said positioning tube and adapted to be fastened to the vehicle wheel.

9. The electric generator as claimed in claim 1, wherein said inlet vent hole tapers in a direction toward said receiving space.

* * * * *